United States Patent
Sitnikov et al.

(10) Patent No.: US 10,941,545 B2
(45) Date of Patent: Mar. 9, 2021

(54) HYDRANT MONITORING SYSTEM

(71) Applicant: Mueller International, LLC, Atlanta, GA (US)

(72) Inventors: Timofey Sitnikov, Harrison, TN (US); Paul S. Gifford, Chattanooga, TN (US); Carlos Stephen Moreno, Chattanooga, TN (US)

(73) Assignee: Mueller International, LLC, Atlanta, GA (US)

( * ) Notice: Subject to any disclaimer, the term of this patent is extended or adjusted under 35 U.S.C. 154(b) by 0 days.

(21) Appl. No.: 16/435,339

(22) Filed: Jun. 7, 2019

(65) Prior Publication Data

US 2020/0385961 A1     Dec. 10, 2020

(51) Int. Cl.
*E03B 9/04* (2006.01)
*G01L 19/08* (2006.01)

(52) U.S. Cl.
CPC .............. *E03B 9/04* (2013.01); *G01L 19/086* (2013.01); *Y10T 137/5456* (2015.04)

(58) Field of Classification Search
CPC ... E03B 9/02; E03B 9/04; E03B 9/025; E03B 9/027; G01L 19/086; Y10T 137/5456
USPC .................................. 137/272–308
See application file for complete search history.

(56) References Cited

U.S. PATENT DOCUMENTS

| | | |
|---|---|---|
| 4,793,557 A | 12/1988 | Marchese et al. |
| D314,227 S | 1/1991 | Christ |
| 6,816,072 B2 | 11/2004 | Zoratti |
| 7,980,317 B1 | 7/2011 | Preta et al. |
| 8,130,107 B2 * | 3/2012 | Meyer ............... G01M 3/18 137/312 |
| 8,589,092 B2 | 11/2013 | Plouffe et al. |
| 8,614,745 B1 | 12/2013 | Wasmeyya |
| 8,657,021 B1 | 2/2014 | Preta et al. |
| 8,931,505 B2 | 1/2015 | Hyland et al. |
| 9,291,520 B2 | 3/2016 | Fleury, Jr. et al. |
| 9,388,554 B2 | 7/2016 | Bost |
| 9,458,609 B2 | 10/2016 | Fleury, Jr. et al. |
| D790,663 S | 6/2017 | Peterson et al. |
| 9,670,650 B2 | 6/2017 | Pinney et al. |
| 9,849,322 B2 | 12/2017 | Hyland et al. |
| 9,861,848 B2 | 1/2018 | Hyland et al. |
| 9,873,008 B2 | 1/2018 | Silvers et al. |
| 9,901,765 B2 | 2/2018 | Silvers et al. |
| 10,612,216 B2 * | 4/2020 | Kennedy ............ E03B 9/02 |
| 2008/0189056 A1 | 8/2008 | Heidl et al. |
| 2017/0082592 A1 | 3/2017 | Morrow et al. |
| 2017/0121949 A1 | 5/2017 | Fleury et al. |

(Continued)

OTHER PUBLICATIONS

Eramosa Engineering, Inc.; Report on Test of Hydrant Network Solutions Inc., Data Rod Assembly for Dry-Barrel Fire Hydrants, publicly available at least as early as Jun. 12, 2018, 23 pgs.

(Continued)

*Primary Examiner* — Kevin L Lee
(74) *Attorney, Agent, or Firm* — Taylor English Duma LLP

(57) ABSTRACT

A sensing assembly assembly for use with a fire hydrant having a stem includes a sensor in fluid communication with a water supply; at least one battery in electrical communication with the sensor; and an antenna in electrical communication with the sensor; wherein at least a portion of the sensing assembly is located within an interior cavity of the stem.

20 Claims, 9 Drawing Sheets

(56) References Cited

U.S. PATENT DOCUMENTS

| | | |
|---|---|---|
| 2017/0370893 A1 | 12/2017 | West |
| 2018/0093117 A1 | 4/2018 | Hyland et al. |
| 2020/0071916 A1 | 3/2020 | Feyling |
| 2020/0080290 A1 | 3/2020 | Kennedy |
| 2020/0384296 A1 | 12/2020 | Sitnikov et al. |
| 2020/0385960 A1 | 12/2020 | Sitnikov et al. |
| 2020/0385962 A1 | 12/2020 | Sitnikov et al. |

OTHER PUBLICATIONS

Hydrant Network Solutions Inc.; Article entitled: "Hydrant Data Rod", copyright 2016, 1 pg.

Hydrant Network Solutions Inc.; Brochure for Hydrant Data Rod, publicly available at least as early as Jun. 12, 2018, 6 pgs.

Nighthawk; Info Sheet for Intelligent Hydrant Solutions Remote Pressure and Temperature Monitoring, located <http://nighthawkcontrol.com/upl/downloads/industry-solutions/reference/ihydrant-poster-presentation-wet-dry-barrel-15988aaa.pdf>, accessible at least as early as Apr. 19, 2019, 1 pg.

Terepac; Article entitled: "One Water", located at <https://www.terepac.com/one-water>, available at least as early as Mar. 2019 according to the Wayback Machine, 5 pgs.

Nighthawk; Info Sheet for iHydrant: Remote Hydrant Pressure & Temperature Monitoring, located at <http://nighthawkcontrol.com/upl/downloads/industry-solutions/reference/ihydrant-info-sheet-71fd3465.pdf>, accessible at least as early as Apr. 19, 2019, 1 pg.

Sitnikov, Timofey; Applicant-Initiated Interview Summary for U.S. Appl. No. 16/434,915, filed Jun. 7, 2019, dated Oct. 19, 2020, 7 pgs.

Sitnikov, Timofey; Applicant-Initiated Interview Summary for U.S. Appl. No. 16/434,915, filed Jun. 7, 2019, dated Nov. 20, 2020, 7 pgs.

Sitnikov, Timofey; Non-Final Office Action for U.S. Appl. No. 16/434,915, filed Jun. 7, 2019, dated Sep. 10, 2020, 22 pgs.

Sitnikov, Timofey; Corrected Notice of Allowance for U.S. Appl. No. 16/435,357, filed Jun. 7, 2019, dated Oct. 6, 2020, 4 pgs.

Sitnikov, Timofey; Notice of Allowance for U.S. Appl. No. 16/435,357, filed Jun. 7, 2019, dated Oct. 2, 2020, 11 pgs.

Sitnikov, Timofey; Notice of Allowance for U.S. Appl. No. 16/434,915, filed Jun. 7, 2019, dated Dec. 7, 2020, 7 pgs.

Sitnikov, Timofey; Corrected Notice of Allowance for U.S. Appl. No. 16/435,357, filed Jun. 7, 2019, dated Dec. 16, 2020, 5 pgs.

\* cited by examiner

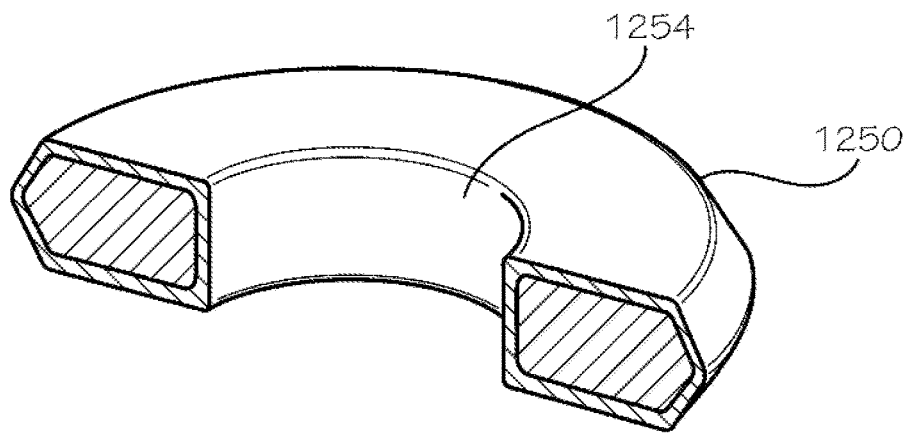
FIG. 8
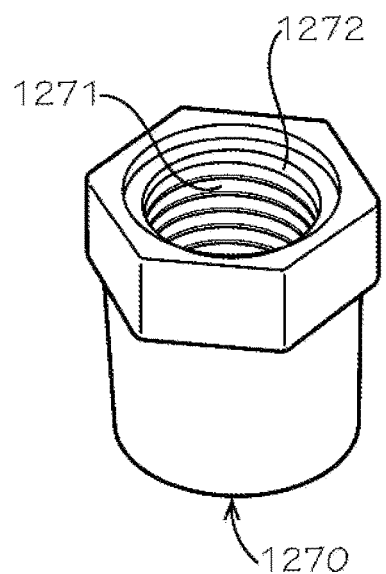
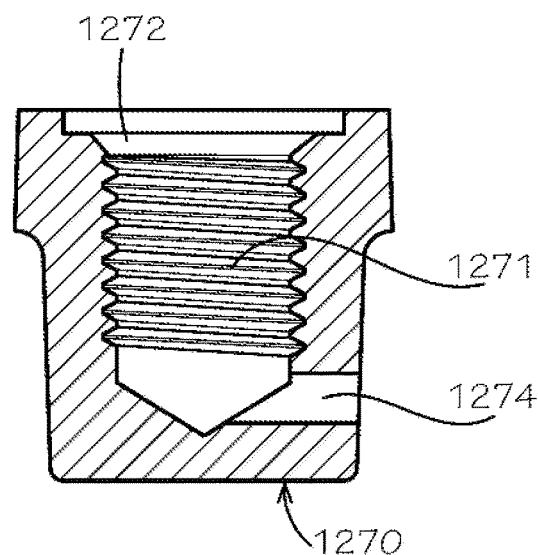
FIG. 9A      FIG. 9B

HYDRANT MONITORING SYSTEM

TECHNICAL FIELD

This disclosure relates to water control products. More specifically, this disclosure relates to smart water control products.

BACKGROUND

In water systems, flow control requires knowledge about the system. In particular, in municipal water systems, understanding and maintaining necessary flow for health and safety of the population requires knowledge regarding the flow in the line. To attain the required knowledge about the flow, one solution includes sensing the flow. However, in the field, placing sensors can be difficult, and the sensors can cause weaknesses in water mains. Additionally, miles and miles of wiring would be needed to connect sensors from the field to a main monitoring and control station.

SUMMARY

It is to be understood that this summary is not an extensive overview of the disclosure. This summary is exemplary and not restrictive, and it is intended to neither identify key or critical elements of the disclosure nor delineate the scope thereof. The sole purpose of this summary is to explain and exemplify certain concepts of the disclosure as an introduction to the following complete and extensive detailed description.

One aspect of a fire hydrant capable of connection to a shoe that defines a cavity includes: an upper barrel defining a cavity for fluid flow; a bonnet connected to a top of the upper barrel; a lower barrel assembly connected to a bottom of the upper barrel, the lower barrel assembly comprising a lower barrel defining a cavity in fluid communication with the cavity of the upper barrel, the lower barrel assembly comprising a sensing assembly located at least partially within the cavity of the lower barrel; a valve assembly located in sealing communication with a lower end of the lower barrel, the valve assembly comprising: a valve plate for sealing the valve proximate a lower end of the lower barrel; a valve retainer contacting the valve plate and located proximate the shoe; and a valve reinforcement contacting the valve plate and located within the cavity of the lower barrel; and a stem mechanically connected to the valve assembly to allow opening and closing of the sealing communication of the valve assembly with the lower end of the lower barrel, the stem being at least partially hollow and defining an interior cavity, wherein the sensing assembly comprises: a sensor in fluid communication with the shoe; at least one battery in electrical communication with the sensor; and an antenna in electrical communication with the sensor; wherein at least a portion of the sensing assembly is located within the interior cavity of the stem.

One aspect of a sensing assembly for connection to a fire hydrant having a hollow stem, the fire hydrant in fluid communication with a shoe, the sensing assembly includes: a sensor in fluid communication with the shoe; at least one battery in electrical communication with the sensor; and an antenna in electrical communication with the sensor; wherein at least a portion of the sensing assembly is located within the interior cavity of the stem.

One aspect of a method of forming a fire hydrant assembly to connect to a municipal pipeline including a shoe, the method includes: obtaining a fire hydrant assembly comprising an upper barrel defining a cavity, a bonnet connected to an upper end of the upper barrel, and a lower barrel defining a cavity and connected to a lower end of the upper barrel; connecting a valve assembly in sealable communication with a lower end of the lower barrel, the valve assembly comprising a valve plate in sealable communication with the lower end of the lower barrel, a valve retainer contacting a lower end of the valve plate, and a valve reinforcement contacting an upper end of the valve plate; obtaining a stem assembly, the stem assembly comprising an upper stem and a lower stem, wherein the lower stem is at least partially hollow to define a cavity therein; and placing a sensing assembly in fluid communication with a lower end of the valve reinforcement, the sensing assembly comprising: a sensor in fluid communication with the lower end of the valve reinforcement; at least one battery in electrical communication with the sensor; and an antenna in electrical communication with the sensor; wherein at least a portion of the sensing assembly is located within the interior cavity of the stem.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIG. 5 is an exploded perspective view of the portions of the sensing assembly seen in

FIG. 4.

FIG. 8 is a perspective cross-sectional view of a valve plate of the fire hydrant assembly of FIG. 1.

FIG. 9A is perspective view of a valve nut of the fire hydrant assembly of FIG. 1.

FIG. 9B is a cross-sectional view of the valve nut of FIG. 9A.

DETAILED DESCRIPTION

Figure 1:
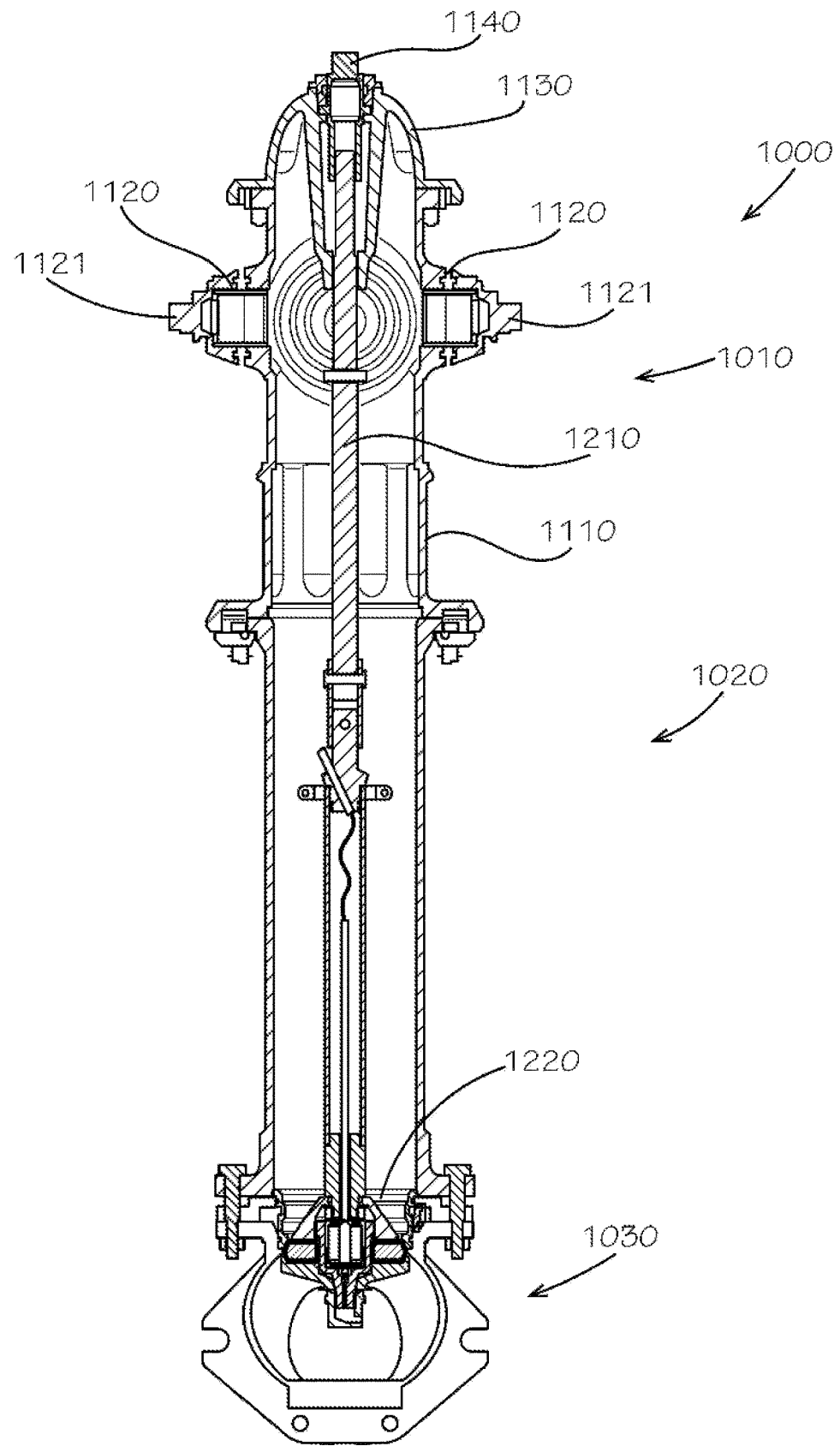
FIG. 1 is a front cross-sectional view of a fire hydrant assembly in accord with one aspect of the current disclosure, wherein a portion of the assembly is displayed as transparent.

The present disclosure can be understood more readily by reference to the following detailed description, examples, drawings, and claims, and the previous and following description. However, before the present devices, systems, and/or methods are disclosed and described, it is to be understood that this disclosure is not limited to the specific devices, systems, and/or methods disclosed unless otherwise specified, and, as such, can, of course, vary. It is also to be understood that the terminology used herein is for the purpose of describing particular aspects only and is not intended to be limiting.

The following description is provided as an enabling teaching of the present devices, systems, and/or methods in its best, currently known aspect. To this end, those skilled in the relevant art will recognize and appreciate that many changes can be made to the various aspects of the present devices, systems, and/or methods described herein, while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations to the present disclosure are possible and can even be desirable in certain circumstances and are a part of the present disclosure. Thus, the following description is provided as illustrative of the principles of the present disclosure and not in limitation thereof.

As used throughout, the singular forms "a," "an" and "the" include plural referents unless the context clearly dictates otherwise. Thus, for example, reference to "an element" can include two or more such elements unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

For purposes of the current disclosure, a material property or dimension measuring about X or substantially X on a particular measurement scale measures within a range between X plus an industry-standard upper tolerance for the specified measurement and X minus an industry-standard lower tolerance for the specified measurement. Because tolerances can vary between different materials, processes and between different models, the tolerance for a particular measurement of a particular component can fall within a range of tolerances.

As used herein, the terms "optional" or "optionally" mean that the subsequently described event or circumstance can or cannot occur, and that the description includes instances where said event or circumstance occurs and instances where it does not.

The word "or" as used herein means any one member of a particular list and also includes any combination of members of that list. Further, one should note that conditional language, such as, among others, "can," "could," "might," or "may," unless specifically stated otherwise, or otherwise understood within the context as used, is generally intended to convey that certain aspects include, while other aspects do not include, certain features, elements and/or steps. Thus, such conditional language is not generally intended to imply that features, elements and/or steps are in any way required for one or more particular aspects or that one or more particular aspects necessarily include logic for deciding, with or without user input or prompting, whether these features, elements and/or steps are included or are to be performed in any particular aspect.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific aspect or combination of aspects of the disclosed methods.

Disclosed is a fire hydrant and associated methods, systems, devices, and various apparatus. The fire hydrant can comprise a sensing assembly. It would be understood by one of skill in the art that the disclosed fire hydrant is described in but a few exemplary aspects among many. No particular terminology or description should be considered limiting on the disclosure or the scope of any claims issuing therefrom.

One aspect of a fire hydrant 1000 is disclosed and described with reference to FIG. 1. The fire hydrant 1000 can be equipped with apparatus sufficient to sense water flow characteristics. The fire hydrant 1000 can be equipped with apparatus sufficient to communicate from the fire hydrant 1000 to outside nodes of a network. The fire hydrant 1000 can be equipped with apparatus sufficient to communicate from one location within the fire hydrant 1000 to another location within the fire hydrant 1000 for repeating outside the network. In various aspects, the fire hydrant 1000 can communicate sensed data from the water flow. One of skill in the art would understand that the disclosed fire hydrant 1000 provides but a few exemplary embodiments that can be implemented in many ways with sufficient knowledge and skill in the art.

The fire hydrant 1000 can comprise an upper barrel assembly 1010, a lower barrel assembly 1020, and a shoe 1030. In various aspects, the fire hydrant 1000 can be arranged such that the upper barrel assembly 1010 can be above ground, the lower barrel assembly 1020 can be at least partially subterranean, and the shoe 1030 can be connected to the municipal water system in the ground.

The upper barrel assembly 1010 can comprise an upper barrel 1110, a plurality of nozzles 1120 adapted for connection of fire hoses or other equipment, nozzle caps 1121 covering the nozzles 1120 and adapted to be removable, and a bonnet 1130 connected or attached to the upper barrel 1110. In the current aspect, the bonnet 1130 can be attached to the upper barrel 1110 by bolts. The upper barrel assembly 1010 can be connected or attached to the lower barrel assembly 1020; in the current aspect, the attachment can be made by bolts. A stem 1210 can be located within the fire hydrant 1000 and can connect from the bonnet 1130 to a valve assembly 1220 located at the juncture between the shoe 1030 and the lower barrel assembly 1020. The stem can be actuated by an operation nut 1140 at the top of the bonnet 1130.

Figure 2:
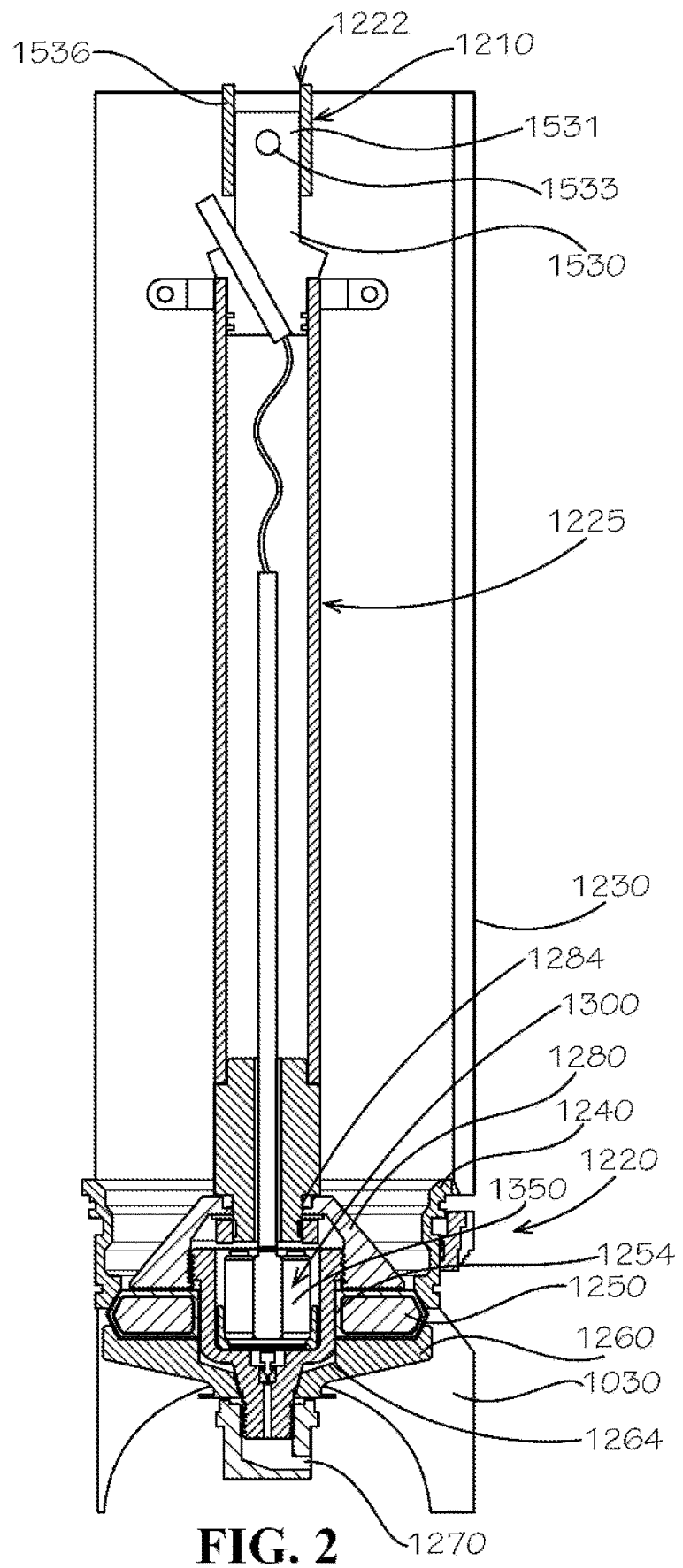
FIG. 2 is a close-up cross-sectional view of the fire hydrant assembly of FIG. 1.

As seen with reference to FIG. 2, the stem 1210 can connect to the valve assembly 1220 for actuation when in use. In the current aspect, the stem 1210 can be a stem assembly and can comprise an upper stem 1222 and a lower stem 1225. In the current aspect, the lower stem 1225 can be an assembly. The lower barrel assembly 1020 can comprise a lower barrel 1230. In most arrangements, the fire hydrant 1000 can be in a state such that no water is located in the upper barrel 1110 or the lower barrel 1230. In use, the valve assembly 1220 can be operated by the operation nut 1140 to open the valve assembly 1220 and to allow the flow of water into the upper barrel 1110 and the lower barrel 1230. As seen with reference to FIG. 2, a valve shoe 1240 can be located to connect the lower barrel 1230 to the shoe 1030.

The valve assembly 1220 can comprise multiple parts. A valve plate 1250 can comprise a rigid or semi-rigid disc or other covering. In various aspects, the valve plate 1250 can be coated in a sealing material such as rubber or elastomer. Location of the valve plate 1250 can provide the water seal that can prevent water from ascending into the lower barrel 1230. The valve assembly 1220 can comprise a valve retainer 1260 located adjacent to the valve plate 1250 that can actuate the valve plate 1250. In various aspects, the valve retainer 1260 can provide the translational force to seal the valve plate 1250 to the valve shoe 1240. A valve nut 1270 can be attached or connected to an end of the stem 1210. The valve nut 1270 can provide a linkage of the stem 1210 to the valve retainer 1260. A valve reinforcement 1280 can be attached to or located proximate to the valve plate 1250.

In various aspects, the fire hydrant 1000 can comprise a sensing assembly 1300. The sensing assembly 1300 can be included to provide water sensing capabilities. In various aspects, the sensing assembly 1300 can comprise communication capabilities. In various aspects, the sensing assembly 1300 can comprise wireless communication capabilities.

Figure 3:
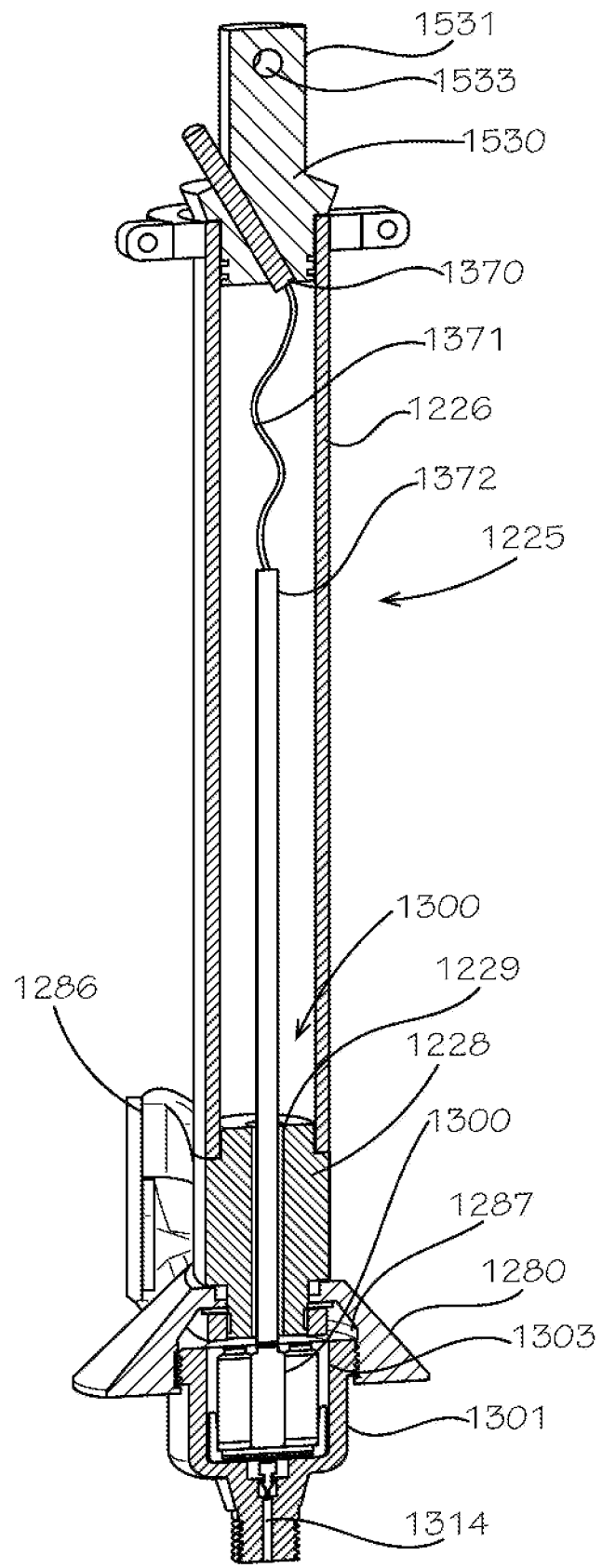
FIG. 3 is a close-up cross-sectional view of a lower stem and sensing assembly of the fire hydrant assembly of FIG. 1.

As see with reference to FIG. 3, the lower stem 1225 can be hollow to allow the housing of electronics or other apparatus to be portions of the sensing assembly 1300. As seen with reference to FIGS. 2-3, each of the valve plate 1250, the valve retainer 1260, and the valve reinforcement 1280 can comprise features to allow the sensing assembly 1300 access to the water supply. Without access, the sensing assembly 1300 could not provide any sensed data. Each of the valve plate 1250, valve retainer 1260, and valve reinforcement 1280 can comprise a location for at least a portion of the stem 1210 or lower stem 1225. The valve plate 1250 can define a stem bore 1254. The valve retainer 1260 can define a stem pocket 1264. The valve reinforcement 1280 can define a stem bore 1284. The valve reinforcement 1280 can comprise at least one stanchion 1286.

In various aspects, the lower stem 1225 can be of enlarged diameter as compared to traditional stems of traditional fire hydrant assemblies. In one aspect among many, the lower stem 1225 can be about 1.90 inches in exterior diameter and about 1.50 inches in interior diameter. As such, the wall thickness of the lower stem 1225 can be about 0.20 inches. In various aspects, the lower stem 1225 can be made of steel or varying materials of like strength, stiffness, and toughness as would be understood by one of skill in the art. The lower stem 1225 can withstand a buckling load of over 200,000 pounds and a torsional shear stress of over 2,400 pounds per square inch.

As seen with reference to FIG. 3 and with returning reference to FIG. 2, the sensing assembly 1300 can be located at least partially within the lower stem 1225 and can also be located at least partially within an electronics cavity 1287 defined within the valve reinforcement 1280. A sensor housing 1301 can house or locate at least a portion of the sensing assembly 1300. The sensor housing 1301 can define a housing cavity 1303 into which portions of the sensing assembly can be located. The sensor housing 1301 can also define a channel 1314. The channel 1314 can be defined within the sensor housing 1301 from a bottom end of the sensor housing 1301 to the housing cavity 1303 allowing fluid communication from an exterior of the sensor housing 1301 to the housing cavity 1303. In various aspects, the term "channel" can be used to describe or define a void or, in some context, a fluid pathway. The channel 1314 can allow fluid communication from inside the shoe 1030 to sensing apparatus described in more detail below. The sensor housing 1301 can comprise a threaded interaction with the valve reinforcement 1280 such that at least a portion of the sensor housing 1301 can be attached to the valve reinforcement 1280 within the electronics cavity 1287. In various aspects, various arrangements of connections can be utilized as would be understood by one of skill in the art. Batteries 1350 can be seen located within the housing cavity 1303 as part of the sensing assembly 1300. A first portion 1226 of the lower stem 1225 can be substantially hollow as previously described; a second portion 1228 or transition portion can be coupled to the first portion 1226 and can serve as a transition in connection from the substantially hollow lower stem 1225 to the valve reinforcement 1280. The second portion 1228 can define an antenna channel 1229 extending from a lower end of the second portion 1228 to an upper end of the second portion 1228. The antenna channel 1229 can allow wired electronics to communicate from the portions of the sensing assembly 1300 within the housing cavity 1303 to an antenna 1370 by a wire 1371. A sheath 1372 can be included in various aspects.

Figure 4:
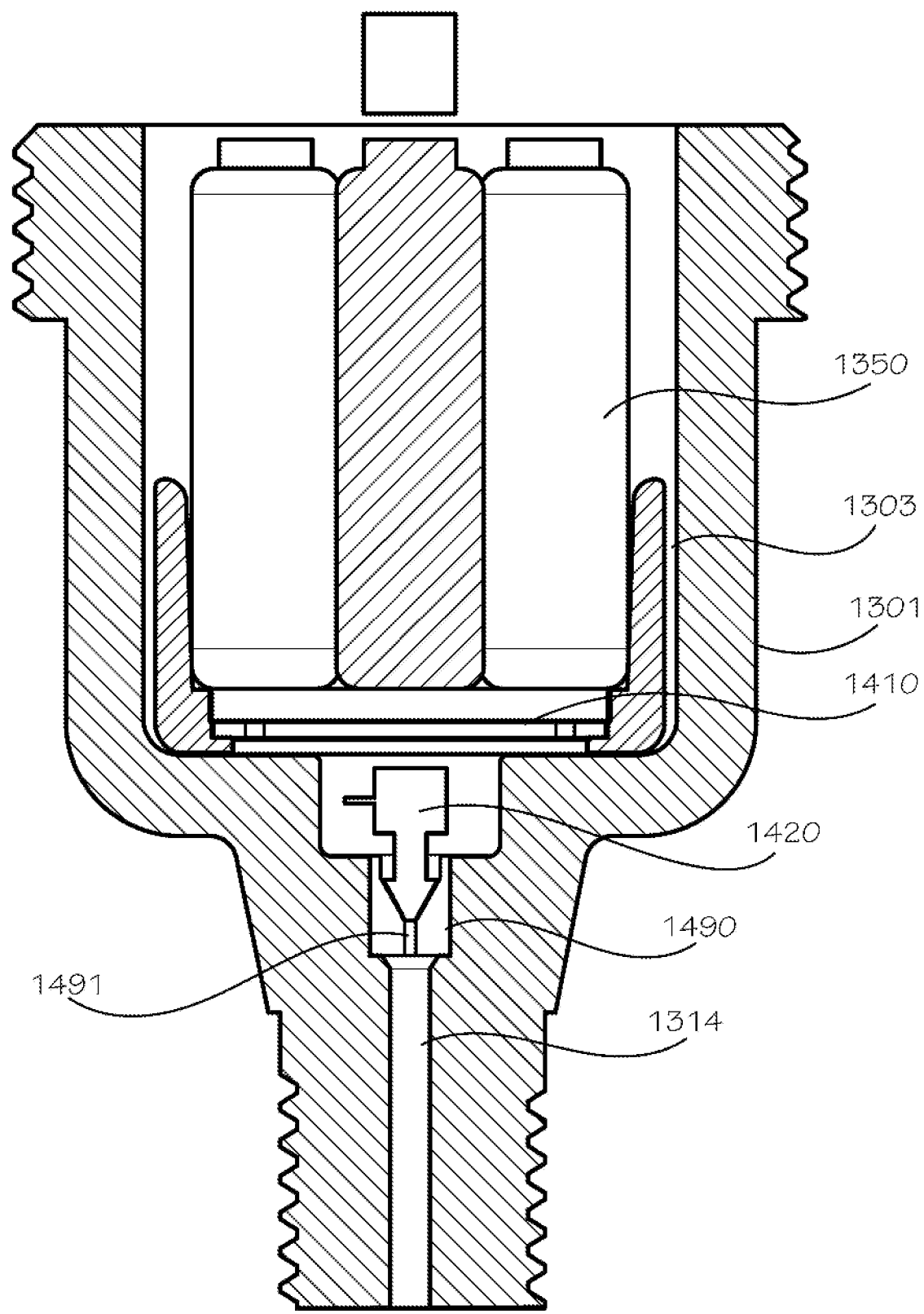
FIG. 4 is a close-up view of the cross-sectional view of portions of the sensing assembly of the fire hydrant assembly of FIG. 1.

As seen with reference to FIG. 4, the channel 1314 can be defined within the sensor housing 1301. A nozzle 1490 can be located within or otherwise in fluid communication with the channel 1314. The nozzle 1490 can provide a location of attachment for a sensor 1420. The nozzle 1490 can be defined within or placed within the channel 1314 in various aspects. The nozzle 1490 can be shaped to interact with the sensor 1420 to allow fluid communication of the sensor 1420 with the channel 1314 while maintaining a fluid seal. In various aspects, the nozzle 1490 can be of a variety of materials, including various rubbers, to allow fluid sealing under the high pressures of municipal water systems.

Figure 5:
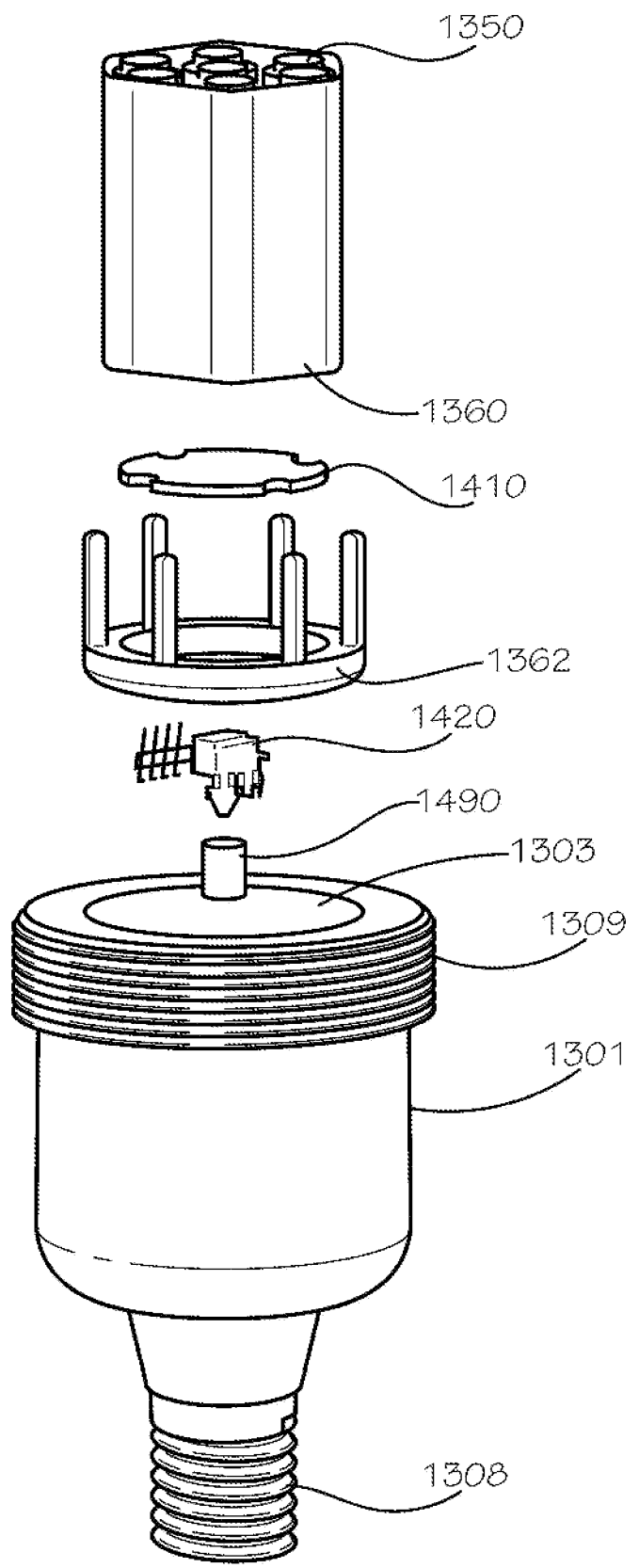

As seen with reference to FIGS. 4-5, the sensing assembly 1300 can comprise a printed circuit board (PCB) 1410. In various aspects, the PCB 1410 can be various arrangements of electronic components. In various aspects, the PCB 1410 can be eliminated by circuitry. The PCB 1410 in the current aspect can be in electrical communication with the sensor 1420. The sensor 1420 can be of a variety of sensors known in the art, including pressure, temperature, salinity, purity, and various other sensing types. The PCB 1410 can also be in electrical communication with the batteries 1350. Additionally, a channel 1491 can be defined within the nozzle 1490 to provide fluid communication through the nozzle 1490.

A battery container 1360 can be a semi-rigid container to hold batteries 1350 without substantial bulk. The battery container 1360 can be arranged to be placed around and to contain the batteries 1350. As a result, the battery container 1360 can serve as a rigid or semi-rigid container in various aspects for a plurality of batteries 1350. In the current aspect, the battery container 1360 can contain six or seven batteries 1350. The battery container 1360 can be a part of the sensing assembly 1300. A mounting bracket 1362 can be included to locate and to contain portions of the sensing assembly 1300 within the housing cavity 1303. As can be seen, nut threading 1308 can be seen formed on an outer surface of the sensor housing 1301. Additionally, mounting threading 1309 can be seen formed on an outer surface of the sensor housing 1301.

Figure 6:
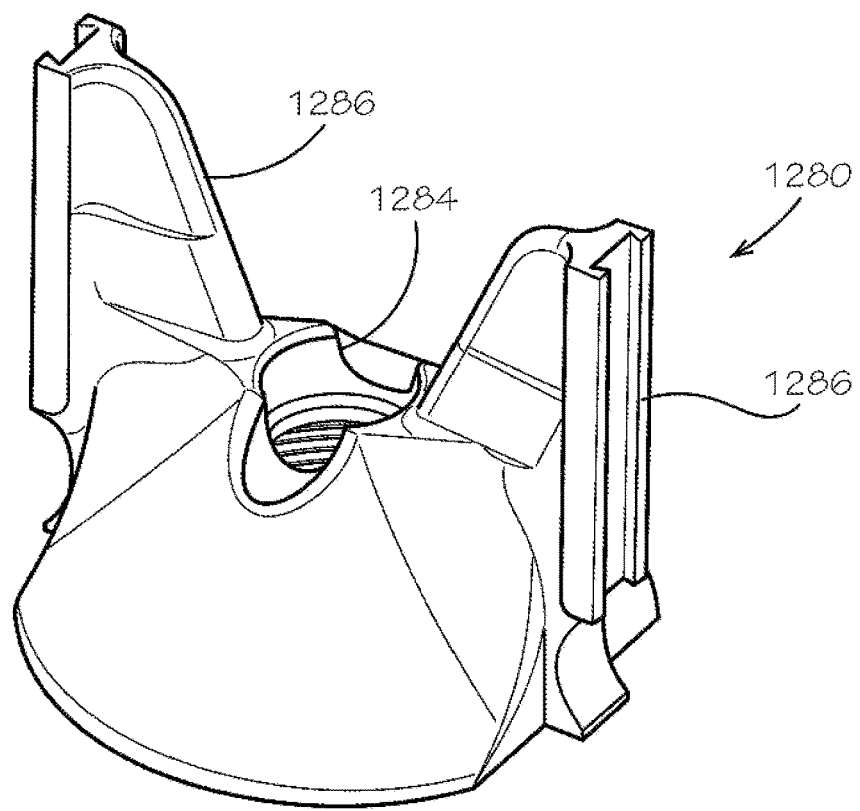
FIG. 6 is a perspective view of a valve reinforcement of the fire hydrant assembly of FIG. 1.
Figure 7:
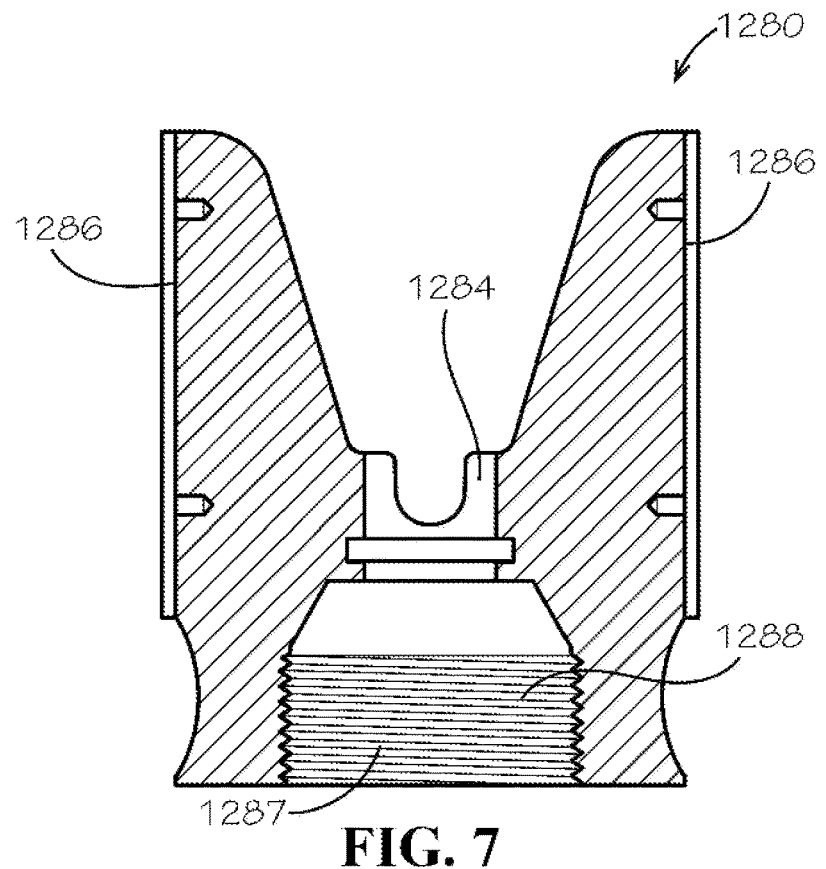
FIG. 7 is a cross-sectional view of the valve reinforcement of FIG. 6

As seen with reference to FIGS. 6-7, the valve reinforcement 1280 can comprise at least one stanchion 1286. The valve reinforcement 1280 can define the stem bore 1284 that can be in communication with the electronics cavity 1287. As can be seen, the electronics cavity 1287 can be enlarged as compared to the stem bore 1284 such that a diameter of the electronics cavity 1287 can be larger than a diameter of the stem bore 1284. The enlarged diameter can allow the location of the electronics of the sensing assembly 1300 within the sensor housing 1301 (seen with reference to FIG. 5) to be mounted within the electronics cavity 1287. As such, the electronics cavity 1287 can comprise threading 1288 formed by a surface of the electronics cavity 1287 to interact with the mounting threading 1309 of the sensor housing 1301. Such threading can help define a fluid seal and a strong connection when the sensor housing 1301 is attached to the valve reinforcement 1280. With much of the electronics of the sensing assembly 1300 located with the lower stem 1225, a connection of the electronics within the electronics cavity 1287 can communicate upwards through the lower stem 1225 as previously indicated.

As seen with reference to FIG. 8, the stem bore 1254 of the valve plate 1250 can be enlarged to accommodate location of the sensor housing 1301 within the valve assembly 1220.

The valve nut 1270 can be seen with reference to FIGS. 9A-9B. As can be seen, the valve nut 1270 can comprise threading 1271 defined within a nut cavity 1272. The threading 1271 can interact with the nut thread 1308 of the sensor housing 1301 to provide a secure attachment of the valve retainer 1260. In the current aspect, the valve nut 1270 can define a fluid channel 1274 providing a fluid pathway from the nut cavity 1272 to an exterior of the valve nut 1270. In use, the valve nut 1270 can be located within the shoe 1030 such that it is in direct interaction with fluid flowing within the shoe 1030. Therefore, the fluid pathway provided by the valve nut 1270 can allow flow of fluid into the nut cavity 1272 and thereby into the sensor housing 1301 to be sensed by the sensor 1420.

As seen with returning reference to FIG. 2-3, a sealing cap 1530 can be arranged to seal a top end of the lower stem 1225 and provide a fluid seal to prevent fluid within the fire hydrant 1000 from coming into contact with any electronics. The sealing cap 1530 can be formed of a fluid sealing material such as rubber or the like. The sealing cap 1530 can define a void to allow portions of the antenna 1370 to protrude through. In various aspects, the sealing cap 1530 can be of a molded material, and portions of the sealing cap 1530 can be molded around the antenna 1370. The antenna 1370 can be allowed to protrude through to allow near-field communication with a repeater elsewhere in the fire hydrant 1000 or in close proximity to the fire hydrant 1000 such that interference is minimized. In one aspect, the antenna 1370 can be in wireless communication with a repeater located within the bonnet 1130. The repeater can then communicate data from the antenna 1370 to a network outside of the fire hydrant 1000. In various aspects, the bonnet 1130 can be formed of a non-ferrous material to prevent communication interference from the bonnet 1130 to the network. The sealing cap 1530 can be attached to the lower stem 1225 by rivets (not shown). The sealing cap 1530 can also comprise a post 1531 for coupling the upper stem 1222 to the lower stem 1225. As such, in various aspects, the sealing cap 1530 can serve as a coupling. In the current aspect, the post 1531 can define a coupling port 1533 into which a rivet or fastener can be located to couple the upper stem 1222 to the lower stem 1225. In various aspects, an upper stem coupling 1536 can be utilized as a portion of the upper stem 1222 to connect the sealing cap 1530 to the upper stem 1222. In various aspects, the sealing cap 1530 can be attached by various means, including threading, gluing, sealing, or integrated formation.

Figure 10:
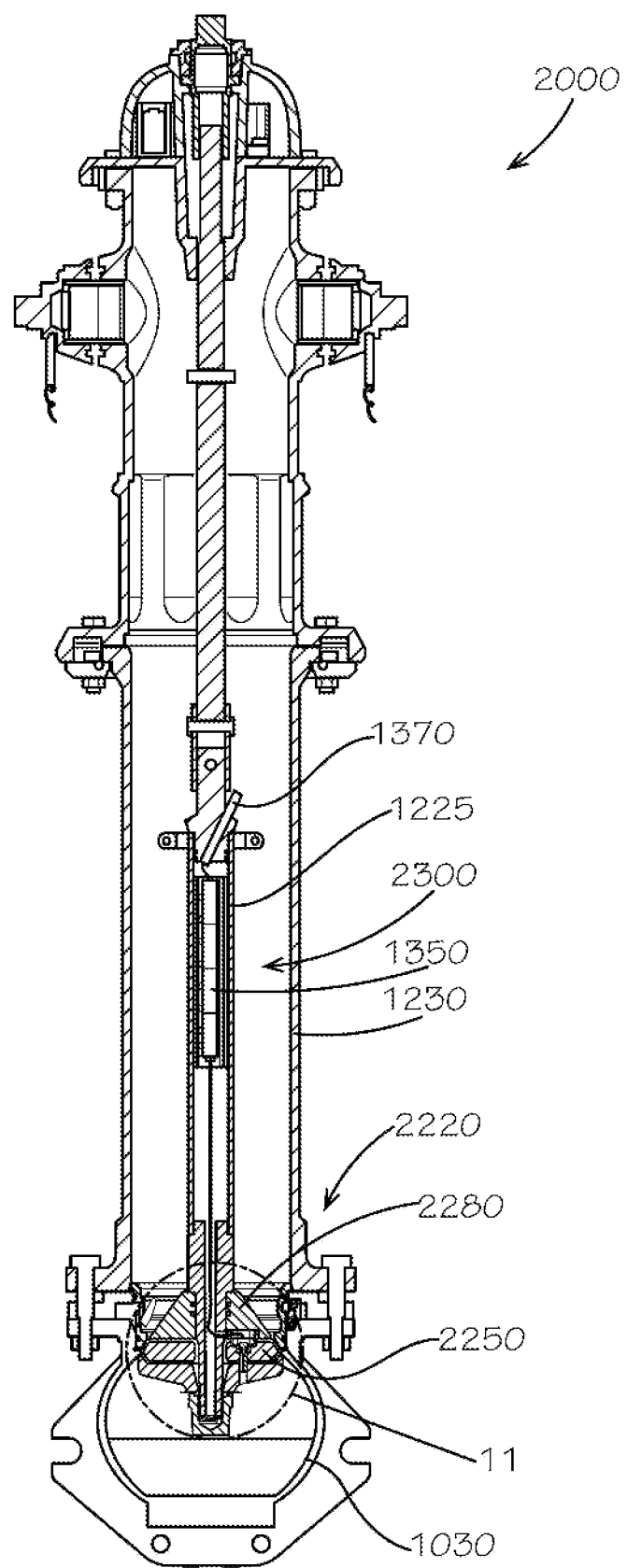
FIG. 10 is a front cross-sectional view of a fire hydrant assembly in accord with one aspect of the current disclosure, wherein a portion of the assembly is displayed as transparent.
Figure 11:
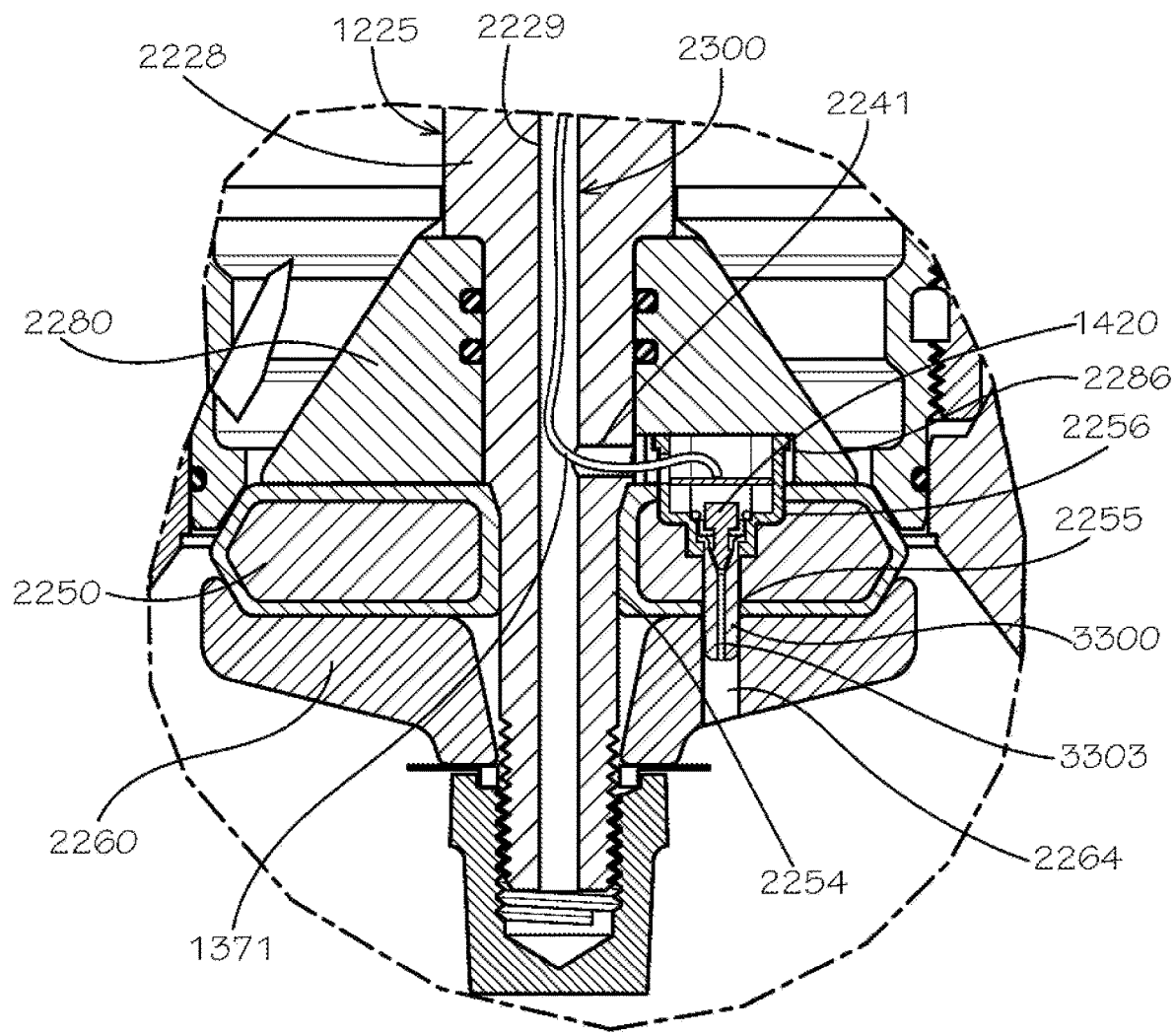
FIG. 11 is a detail view of the front cross-sectional view of the fire hydrant assembly of FIG. 10 as indicated by Detail 11 in FIG. 10.

Another aspect of a fire hydrant 2000 can be seen with respect to FIG. 10-11. The fire hydrant 2000 can comprise a valve assembly 2220 and the lower barrel 1230, as well as many other portions similar to the fire hydrant 1000. In the current aspect, the fire hydrant 2000 can comprise a sensing assembly 2300. Batteries 1350 can be located within the lower stem 1225 in a battery container (not shown in detail) that aligns the batteries 1350 in a vertical arrangement rather than in a side-by-side arrangement. As such, portions of the sensing assembly 2300 can be in varied arrangement. As contrasted with fire hydrant 1000, fire hydrant 2000 can omit certain features such as the sensor housing 1301. By omitting the sensor housing 1301, the fire hydrant 2000 can be arranged with parts that do not include enlarged openings. For example, the valve plate 2250 of the current aspect can define a stem bore 2254 that is of about the same diameter as the lower stem 1225. Further, a valve reinforcement 2280 need not include any enlarged opening or internal threading to interact with the sensor housing 1301 when the sensor housing 1301 is omitted. In various aspects, the sensor housing 1301 can be included with an arrangement such as fire hydrant 2000.

As seen with reference to FIG. 11, the lower stem 1225 can comprise a transition portion 2228 that is longer than the second portion 1228 of fire hydrant 1000. The transition portion 2228 can define an antenna channel 2229. A valve retainer 2260 can be included in the valve assembly 2220. The valve retainer 2260 can define a channel 2264 in fluid communication with a channel 2255 defined within the valve plate 2250. A vein 3300 can be located within the channels 2264, 2255 such that the vein 3300 is in fluid communication with the region outside of the valve reinforcement 2280 and, therefore, in fluid communication with the fluid inside the shoe 1030.

The valve plate 2250 can further define a sensor recess 2256 for location of various electronic components of the sensing assembly 2300. Similarly, the valve reinforcement 2280 can define a sensor recess 2286 arranged to align with the sensor recess 2256. The sensor 1420 can be located within the sensor recess 2256 such that it is in fluid communication with a channel 3303 defined within the vein 3300 thereby allowing the sensor 1420 to sense various aspects of the fluid within the channel 3303. The PCB 1410 can be located proximate to the sensor 1420 and in electrical communication with the sensor 1420 such that at least a portion of one of the sensor 1420 and the PCB 1410 can be located within at least one of the sensor recess 2286 and the sensor recess 2256. An antenna inlet 2241 can allow a pathway for a wire 1371 to the antenna 1370.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A fire hydrant capable of connection to a shoe that defines a cavity, the fire hydrant comprising:
    an upper barrel defining a cavity for fluid flow;
    a bonnet connected to a top of the upper barrel;
    a lower barrel assembly connected to a bottom of the upper barrel, the lower barrel assembly comprising a lower barrel defining a cavity in fluid communication with the cavity of the upper barrel, the lower barrel assembly comprising a sensing assembly located at least partially within the cavity of the lower barrel;
    a valve assembly located in sealing communication with a lower end of the lower barrel, the valve assembly comprising:
        a valve plate for sealing the valve assembly proximate a lower end of the lower barrel;
        a valve retainer contacting the valve plate and located proximate the shoe; and
        a valve reinforcement contacting the valve plate and located within the cavity of the lower barrel; and
    a stem mechanically connected to the valve assembly to allow opening and closing of the sealing communication of the valve assembly with the lower end of the lower barrel, the stem being at least partially hollow and defining an interior cavity, a sensor housing mechanically coupled to the valve reinforcement,
    wherein the sensing assembly comprises:
        a sensor in fluid communication with the shoe;
        at least one battery in electrical communication with the sensor; and
        an antenna in electrical communication with the sensor;
        wherein at least a portion of the sensing assembly is located within the interior cavity of the stem,
    wherein the sensing assembly is at least partially contained within the sensor housing.

2. The fire hydrant of claim 1, wherein the sensor housing defines a fluid pathway from an exterior of the sensor housing to an interior of the sensor housing, and wherein the sensor is in fluid communication with the fluid pathway.

3. The fire hydrant of claim 2, further comprising a valve nut coupled to an exterior of the sensor housing, wherein the valve nut defines a fluid pathway and wherein the fluid pathway of the valve nut is in fluid communication with the fluid pathway of the sensor housing.

4. The fire hydrant of claim 1, wherein the valve reinforcement defines an electronics cavity, the electronics cavity sized to accept the sensor housing.

5. The fire hydrant of claim 1, wherein the valve plate defines a channel and wherein the valve retainer defines a channel, wherein the channel of the valve plate is in fluid communication with the channel of the valve retainer, wherein the channel of the valve retainer is in fluid communication with the shoe, and wherein the sensor is located in fluid communication with the channel of the valve plate.

6. The fire hydrant of claim 5, wherein a vein is located at least partially within the channel of the valve plate and at least partially within the channel of the valve retainer, wherein the sensor contacts the vein.

7. The fire hydrant of claim 1, wherein the sensor is a pressure sensor.

8. The fire hydrant of claim 1, wherein the sensing assembly further comprises a battery pack assembly, the battery pack assembly comprising each at least one battery and a battery container.

9. The fire hydrant of claim 1, wherein the antenna is a near-field communication antenna.

10. The fire hydrant of claim 1, wherein the sensing assembly further comprises a PCB in electrical communication with the sensor.

11. The fire hydrant of claim 1, wherein the stem comprises an upper stem and a lower stem, wherein the lower stem is hollow.

12. The fire hydrant of claim 11, further comprising a cap sealing at least one end of the lower stem, wherein the antenna is arranged within the cap.

13. The fire hydrant of claim 12, wherein the cap is a coupling from the lower stem to an upper stem.

14. The fire hydrant of claim 10, wherein the sensor, the PCB, and each battery is contained in the sensor housing.

15. A sensing assembly for connection to a fire hydrant having a hollow stem defining an interior cavity, the fire hydrant in fluid communication with a shoe, the sensing assembly comprising:
    a sensor in fluid communication with the shoe;
    at least one battery in electrical communication with the sensor; and
    an antenna in electrical communication with the sensor, wherein each battery and the antenna are at least partially located within the interior cavity of the stem.

16. The sensing assembly of claim 15, wherein the sensor is a pressure sensor.

17. The sensing assembly of claim 15, further comprising a battery pack assembly, the battery pack assembly comprising at least one battery and a battery container.

18. The sensing assembly of claim 15, wherein the antenna is a near-field communication antenna.

19. The sensing assembly of claim 15, further comprising a PCB in electrical communication with the sensor.

20. A method of forming a fire hydrant assembly to connect to a municipal pipeline including a shoe, the method comprising:
    obtaining a fire hydrant assembly comprising an upper barrel defining a cavity, a bonnet connected to an upper end of the upper barrel, and a lower barrel defining a cavity and connected to a lower end of the upper barrel;
    connecting a valve assembly in sealable communication with a lower end of the lower barrel, the valve assembly comprising a valve plate in sealable communication with the lower end of the lower barrel, a valve retainer contacting a lower end of the valve plate, and a valve reinforcement contacting an upper end of the valve plate;

obtaining a stem assembly, the stem assembly comprising an upper stem and a lower stem, wherein the lower stem is at least partially hollow to define an interior cavity therein; and placing a sensing assembly in fluid communication with a lower end of the valve reinforcement, the sensing assembly comprising:
- a sensor in fluid communication with the lower end of the valve reinforcement;
- at least one battery in electrical communication with the sensor; and
- an antenna in electrical communication with the sensor; and wherein the antenna and each battery are at least partially located within the interior cavity of the lower stem.

* * * * *